(12) United States Patent
Weiss et al.

(10) Patent No.: US 9,447,253 B2
(45) Date of Patent: Sep. 20, 2016

(54) HIGH TEMPERATURE SHAPE MEMORY POLYMERS

(71) Applicants: Robert Weiss, Lenox, MA (US); Ying Shi, Akron, OH (US); Mitra Yoonesi, Avon, OH (US)

(72) Inventors: Robert Weiss, Lenox, MA (US); Ying Shi, Akron, OH (US); Mitra Yoonesi, Avon, OH (US)

(73) Assignee: The University of Akron, Akron, OH (US)

(*) Notice: Subject to any disclaimer, the term of this patent is extended or adjusted under 35 U.S.C. 154(b) by 0 days.

(21) Appl. No.: 14/437,014

(22) PCT Filed: Nov. 20, 2013

(86) PCT No.: PCT/US2013/070986
§ 371 (c)(1),
(2) Date: Apr. 20, 2015

(87) PCT Pub. No.: WO2014/081819
PCT Pub. Date: May 30, 2014

(65) Prior Publication Data
US 2015/0284498 A1     Oct. 8, 2015

Related U.S. Application Data

(60) Provisional application No. 61/728,545, filed on Nov. 20, 2012, provisional application No. 61/729,116, filed on Nov. 21, 2012.

(51) Int. Cl.
*C08K 5/098*     (2006.01)
*C08K 5/17*     (2006.01)
(Continued)

(52) U.S. Cl.
CPC ............. *C08K 5/098* (2013.01); *B29C 41/12* (2013.01); *C08K 5/17* (2013.01); *C08L 71/10* (2013.01);
(Continued)

(58) Field of Classification Search
None
See application file for complete search history.

(56) References Cited

U.S. PATENT DOCUMENTS

| | | | | |
|---|---|---|---|---|
| 5,043,396 A | * | 8/1991 | Kitahara | .............. C08F 8/30 525/332.5 |
| 8,299,191 B2 | | 10/2012 | Voit | |
| 2002/0086952 A1 | * | 7/2002 | Chino | ................ B60C 1/00 525/327.6 |
| 2008/0287582 A1 | | 11/2008 | Weiss | |
| 2010/0041777 A1 | | 2/2010 | Schlenoff | |
| 2010/0261834 A1 | * | 10/2010 | Odajima | .............. C08J 5/00 524/571 |

FOREIGN PATENT DOCUMENTS

| | | | |
|---|---|---|---|
| CN | 103265786 | * | 8/2013 |
| WO | 2012/151457 A2 | | 8/2012 |

OTHER PUBLICATIONS

"High Temperature Shape Memory Polymers" authored by Weiss et al. and published in Macromolecules (2013) 46, 4160-61.*

(Continued)

*Primary Examiner* — Marc Zimmer
(74) *Attorney, Agent, or Firm* — Renner Kenner, Greive Bobak, Taylor & Weber

(57) ABSTRACT

A shape memory composition includes a high temperature ionomer having a glass transition temperature or a melting temperature of 100° C. or greater and a modulus at room temperature of $1 \times 10^8$ Pa or greater, the high temperature ionomer including a polymer with ionic units either within the backbone of the polymer or pendant to the backbone or both. The shape memory composition includes crystalline or glassy domains of a low molecular weight non-polymeric compound dispersed in the high temperature ionomer and interacting the ionic units of the high temperature ionomer to form a secondary network characterized by being a reversible network in that it is compromised by the heating of the low molecular weight non-polymeric compound to change out of its crystalline or glassy phase.

14 Claims, 4 Drawing Sheets

(51) Int. Cl.
*C08L 71/10* (2006.01)
*B29C 41/12* (2006.01)
*C08K 5/19* (2006.01)
*G02B 1/04* (2006.01)

(52) U.S. Cl.
CPC ............. *C08G 2280/00* (2013.01); *C08K 5/19* (2013.01); *C08L 2201/12* (2013.01); *C08L 2666/34* (2013.01); *C08L 2666/36* (2013.01); *C08L 2666/66* (2013.01); *G02B 1/04* (2013.01)

(56) References Cited

OTHER PUBLICATIONS

"Shape Memory Behavior of a Polyethylene-based Carboxylate Ionomer", also co-authored by Weiss and published in Macromolecules (2013) 46, 7845-52.*

"Recent Progress in Shape Memory Polymer: New Behavior, Enabling Materials, and Mechanistic Understanding" authored by Zhao et al. and published in Progress in Polymer Science (2015) 49-50, 79-120.*

* cited by examiner

HIGH TEMPERATURE SHAPE MEMORY POLYMERS

CROSS-REFERENCE TO RELATED APPLICATIONS

This application claims the benefit of U.S. provisional patent application Ser. No. 61/728,545 entitled "High Temperature Shape Memory Polymer," filed Nov. 20, 2012, and incorporated by reference in its entirety.

FIELD OF THE INVENTION

The present invention generally relates to shape memory polymer (SMP) compositions and, more particularly to shape memory polymer networks, as well as methods for the preparation of such compositions and uses thereof. More particularly, the present invention relates to SMP compositions and shape memory polymer networks having a relatively high actuation temperature above 100° C., as well as the methods for the preparation of such compositions and uses thereof.

BACKGROUND OF THE INVENTION

Shape memory materials are materials that can change their physical conformation when exposed to an external stimulus, such as a change in temperature. Such materials have a permanent shape, but can be reshaped above a critical temperature and fixed into a temporary shape when cooled under stress to below the critical temperature. When reheated above the critical temperature ("$T_c$", also sometimes called the triggering temperature), the material reverts to the permanent shape. Certain polymers can have shape memory properties.

Shape memory is an inherent property of certain polymers that can arise, in part, from rubber elasticity. One example of rubber elasticity occurs when a crosslinked rubber is stretched and deformed several hundred percent, it still retains the memory of its original shape, and will return to that original shape when the external stress is released. The origin of this well-known phenomenon is changes in the conformational entropy of the network chains. This is distinct from the phenomenon of shape memory, which arises when the elastomer is deformed above a critical temperature, $T_c$, frozen into a temporary shape that is stable below $T_c$, and then heated again above $T_c$ to recover the original shape. To accomplish this, a second "temporary" or reversible network needs to be formed below $T_c$, but disappear above $T_c$.

Thus, at least two crosslinked networks are present in the microstructure of shape memory polymers. A primary network provides permanent crosslinks and the permanent shape of the material. This network is usually composed of covalent bonds, but it may rely on physical bonds (e.g., crystallites, hydrogen bonding, ionic interactions, vitrification, or nanophase separation) if the relaxation times of these "bonds" are sufficiently long such that the bonds behave mechanically as permanent within the timeframe of the use of the material. A second network relies on labile physical bonds, as opposed to covalent bonds, to allow for thermal reversibility of the network. The secondary network is reversible at $T_c$, so that for a temperature greater than $T_c$, the network diminishes or disappears, and the material can be deformed to a new shape. When the material is cooled to below $T_c$, while maintaining the deformation, the physical network reforms into the temporary shape of the material. When reheated above $T_c$ in the absence of external stress, the original shape of the material, that is, the permanent shape is recovered.

In most known shape memory polymers, shape memory is provided by the polymer structure itself, although many applications include fillers and additives to adjust the modulus and/or strength of the material. The permanent networks rely on covalently crosslinked networks or physical networks with sufficiently long relaxation times to remain intact within the characteristic lifetime of the temporary shape. The temporary networks and transitions rely on vitrification, melting of crystalline regions, hydrogen bonds, dipole-dipole bonds, metal complexion, charge transfer, and supramolecular bonds. Adjusting properties such as modulus and/or $T_c$ requires changing the structure of the polymers themselves, and thus considerable effort in polymer design and synthesis.

The development of thermally sensitive SMP's has focused primarily on relatively low transition temperature ($T_c$<100° C.), relatively low modulus elastomeric polymers (modulus <$10^8$ Pa), such as thermoplastic polyurethanes (TPU), cross-linked polyethylene, poly(ε-caprolactone), sulfonated EPDM, and polynorbornene. Those materials are appropriate for applications such as biomedical and surgical materials, smart fabrics, and heat shrinkable tubing. Materials used in aerospace or structural components often require higher modulus (modulus >$10^8$ Pa) and switching temperatures for shape change and actuation.

Thus, while the known classes of SMP's may be suitable for their intended purposes, there nonetheless remains a need in the art for SMP's having higher modulus and switching temperatures to be able to be used in aerospace applications or structural applications.

SUMMARY OF THE INVENTION

In one or more embodiments the present invention provides a shape memory composition comprising: a high temperature ionomer having a glass transition temperature or a melting temperature of 100° C. or greater and a modulus at room temperature of 1×$10^8$ Pa or greater, the high temperature ionomer including a polymer with ionic units either within the backbone of the polymer or pendant thereto or both; and crystalline or glassy domains of a low molecular weight non-polymeric compound dispersed in said high temperature ionomer and interacting with said ionic units of said high temperature ionomer to form a secondary network characterized by being a reversible network in that it is compromised by the heating of said low molecular weight non-polymeric compound to change out of its crystalline or glassy phase.

In one or more embodiments the present invention provides a method as in any embodiment above wherein said polymer of said high temperature ionomer is thermoplastic or thermoset.

In one or more embodiments the present invention provides a method as in any embodiment above wherein said polymer is thermoplastic and is selected from polyaryletherketones, polyesters, polysulfones, polysulfides, polyamides, polyimides, polyolefins, polyacrylates polycarbonates, polyoxymethylene, ABS, and poly(p-phenylene ether).

In one or more embodiments the present invention provides a method as in any embodiment above wherein the polyaryletherketone is selected from poly(ether ether ketone), (PEEK), poly(ether ketone) (PEK), poly(ether ketone ketone) (PEKK) and polyether ketone ether ketone ketone (PEKEKK).

In one or more embodiments the present invention provides a method as in any embodiment above wherein said polymer is thermoset and is selected from epoxy resins, polyimides, polyesters, polyurethanes, vulcanized rubber, polysiloxanes, phenol-formaldehyde resins, urea-formaldehyde resins, melamine resins, cynate ester resins, polycyanurates, fiber reinforced thermoset polymers, and filled-thermoset resins.

In one or more embodiments the present invention provides a method as in any embodiment above wherein said ionic units of the polymer are either anionic or cationic.

In one or more embodiments the present invention provides a method as in any embodiment above wherein the anionic units are derived from one or more of carboxylic acids, phosphonic acids, sulfonic acids, amines that form anions, and thioglycolic acids.

In one or more embodiments the present invention provides a method as in any embodiment above wherein the cationic units are derived from one or more of ammonium, quaternary ammonium, phosphonium, pyridinium and ionene.

In one or more embodiments the present invention provides a method as in any embodiment above wherein the low molecular weight non-polymeric compound is selected from fatty acids and/or fatty acid salts, amines, amides, phosphates, eutectic mixtures of transition metal compounds, fusible metals, ionic liquids, high melting point organic compounds, nanoparticles, and melt processable crystalline or amorphous phosphate glass.

In one or more embodiments the present invention provides a method as in any embodiment above wherein the low molecular weight non-polymeric compound are from 10 nanometers to 10 microns in size in any given dimension.

In one or more embodiments the present invention provides a method as in any embodiment above wherein the low molecular weight non-polymeric compound are from 100 nanometers to 500 nanometers in size in any given dimension.

In one or more embodiments the present invention provides a method as in any embodiment above wherein the low molecular weight non-polymeric compound is from 10 to 75 weight percent of the shape memory polymer composition.

In one or more embodiments the present invention provides a method as in any embodiment above wherein the low molecular weight non-polymeric compound is from 20 to 30 weight percent of the shape memory polymer composition.

In one or more embodiments the present invention provides a method as in any embodiment above wherein the high temperature ionomer is poly(ether ether ketone) (PEEK), and the low molecular weight non-polymeric compound is sodium oleate (NaOl).

In one or more embodiments the present invention provides a method as in any embodiment above wherein PEEK is sulfonated.

DETAILED DESCRIPTION OF ILLUSTRATIVE EMBODIMENTS

Figure 1:
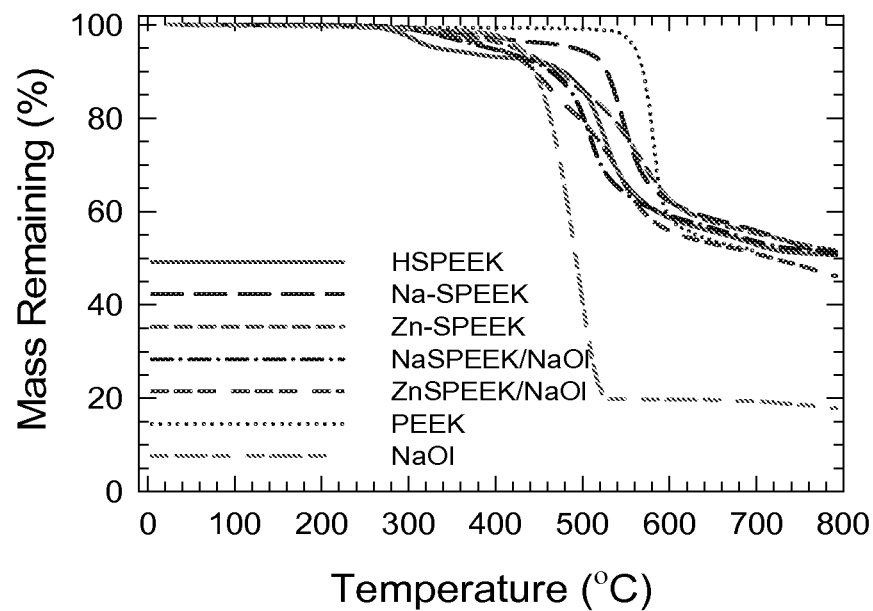
FIG. 1 shows TGA curves for PEEK, H-SPEEK, M-SPEEK, and M-SPEEK/NaOl(30)

Shape memory polymer compositions can be obtained using specific combinations of high temperature ionomer and low molecular weight non-polymeric compounds. A high temperature ionomer is an ionomer having a glass transition temperature, $T_g$, or melting point, $T_m$, of 100° C. or greater. The types and relative amounts of high temperature ionomer and low molecular weight non-polymeric compound are selected to provide the composition with crystalline or glassy amorphous domains of the low molecular weight compound of a size and/or distribution effective to provide shape memory to the composition. These domains are formed by interaction with the ionic units of the high temperature ionomer. It has been found that the critical temperature ($T_c$) of the shape memory polymer composition can be adjusted by selection of an appropriate type and amount of low molecular weight crystalline compound. This property is especially useful when designing applications for the shape memory polymer compositions.

Without being bound by theory, it is believed that the permanent network in the shape memory polymer compositions is provided by the high temperature ionomer in particular by association of the ionic groups, which, due to unfavorable interactions between the ionic and non-ionic groups, produces nanophase separation of the ionic species. These physical crosslinks provide a permanent shape to the shape memory polymer. Further without being bound by theory, it is believed that the polar interactions between the low molecular weight non-polymeric crystalline or glassy compound and the ionic units of the high temperature ionomer stabilize the dispersion of the low molecular weight non-polymeric crystalline or glassy compound in the polymer and provide the continuity between the phases that allows the phase of the low molecular weight non-polymeric crystalline compound to provide a temporary network of physical crosslinks. In some embodiments, the temporary network of the shape memory polymer composition is in the form of crystalline bi-layers of the low molecular weight non-polymeric additive. This feature allows for tailoring of the shape memory polymer properties with the use of different low molecular weight non-polymeric crystalline compounds and their unique triggering melting points.

An ionomer is generally known as a polymer that comprises repeat units of both electrically neutral repeating units and a fraction of ionized units. The ionized units are usually covalently bonded to the polymer backbone as pendant moieties, although it is also acceptable, particularly in some embodiments of this invention, for the ionized units to be the backbone of the polymer. For purposes herein, the ionic groups can be placed statistically along the chain, as in the case of random ionomers; exclusively at the chain ends, as in telechelic ionomers; or in blocks, as in the case of block copolymer ionomers.

In some embodiments, the high temperature ionomers of this invention are based on thermoplastic polymers, i.e., they are thermoplastic polymers with ionized units either pendant to or within the backbone or both pendant to and within the backbone of the thermoplastic polymer. The thermoplastic polymer is chosen such that the ionomer formed therefrom has the requisite high $T_g$ or $T_m$ of 100° C. or greater. The high temperature ionomer can be formed by choosing suitable thermoplastic polymer and reacting it with appropriate ionic species to create the desired ionomer. This method would be particularly suitable for pendant ionized units. The high temperature ionomer can also be formed by choosing suitable monomers, at least some of which are functionalized with desired ionic species, and polymerizing these monomers to form the desired high temperature ionomer. This method would be particularly suitable for incorporation of ionized units in the backbone, though it could also be employed to provide high temperature ionomer with pendant ionic species.

A wide variety of thermoplastic polymers can be used in the present invention. High temperature ionomer forms of thermoplastic polymers have the unique property of forming reversible crosslinks. At melt processing temperatures, crosslinks disassociate to later reform as the material cools to its glass transition temperature or crystallizes. The ionomers can be in the form of a solid or a foam. Ionomeric foams are described, for example, in U.S. Pat. No. 4,186,163 to Brenner et al., U.S. Pat. No. 4,053,548 to Lundberg et al., and U.S. Pat. No. 3,870,662 to Lundberg.

In some embodiments, the high temperature ionomers of this invention are based on thermoset polymers, i.e., they are thermoset polymers with ionized units either pendant to or within the backbone or both pendant to and within the backbone of the thermoset polymer. The thermoset polymer is chosen such that the ionomer formed therefrom has the requisite high $T_g$ or $T_m$ of 100° C. or greater. The high temperature ionomer can be formed by choosing suitable thermoset polymer and reacting it with appropriate ionic species to create the desired ionomer. This method would be particularly suitable for pendant ionized units. The high temperature ionomer can also be formed by choosing suitable monomers, at least some of which are functionalized with desired ionic species, and polymerizing these monomers to form the desired high temperature ionomer. This method would be particularly suitable for incorporation of ionized units in the backbone, though it could also be employed to provide high temperature ionomer with pendant ionic species.

In some embodiments, suitable thermoplastic polymers are selected from polyaryletherketones, polyesters, polysulfones, polysulfides, polyamides, polyimides, polyolefins, polyacrylates polycarbonates, polyoxymethylene, ABS, and poly(p-phenylene ether).

In some embodiments poly(aryletherketones) are selected from poly(ether ether ketone), (PEEK), poly(ether ketone) (PEK), poly(ether ketone ketone) (PEKK) and polyether ketone ether ketone ketone (PEKEKK).

In some embodiments polyesters are selected from poly (ethylene terephthalate) (PET), polytrimethylene terephthalate (PTT), poly(ethylene naphthalene) (PEN), poly(butylene terephthalate) (PBT), poly(lactic acid) (PLA), and poly(hydroxy benzoate-co-hydroxy naphthoate) liquid crystalline polymer.

In some embodiments polysulfones are selected from poly(ether sulfone) (PES) and polyphenylsulfone (PPSU).

In some embodiments polysulfides are selected from poly(phenylene sulfides) such as those known under the tradenames Ryton™ from Chevron Phillips and Torlina™ from Toray.

In some embodiments polyamides are selected from aliphatic polyamides such as nylon 6, nylon 66, nylon 4, nylon 12, polyphthalamide, poly(esteramide) and poly(etheramide).

In some embodiments polyimides are selected from poly (ether imide) (PEI) and thermoplastic polyimide, such as Aurum™ TPI from Mitsui Chemical.

In some embodiments polyolefins are selected from low density polyethylene, high density polyethylene, polypropylene, poly(4-methyl-1-pentene), polystyrene, poly(vinyl chloride), poly(vinylidene chloride), poly(vinylidene fluoride), poly(alpha-methyl styrene), polybutene-1 and ethylene acid copolymer ionomers, such as Surlyn™ from DuPont.

In some embodiments poly(acrylates) are selected from poly(methyl acrylate), poly(methyl methacrylate), poly (ethyl acrylate), poly(butyl acrylate) and poly(butyl methacrylate).

In some embodiments polycarbonates are selected from bisphenol A polycarbonate sold under the tradenames Lexan® by Sabic and Makrolon® by Bayer. In some embodiments polyoxymethlene may be selected from Delrin® from DuPont or Celcon® from Ticona.

In some embodiments ABS may be selected from Edgetek® from PolyOne.

In some embodiments poly(p-phenylene ether) may be selected from Noryl® from Sabic.

In some embodiments, suitable thermoset polymers are selected from epoxy resins, polyimides, polyesters, polyurethanes, vulcanized rubber, polysiloxanes, phenol-formaldehyde resins, urea-formaldehyde resins, melamine resins, cyanate ester resins, polycyanurates, fiber reinforced thermoset polymers, and filled-thermoset resins.

In some embodiments epoxy resin may be crosslinked polymers based on the reaction between an epoxide or oxirane (ethylene oxide) such as epichlorhydrin with a diol such as an aliphatic polyol or an aromatic polyol such as bisphenol A. The product of that reaction may be further crosslinked by reaction with a hardener composed of thiols, acids, acid anhydrides, phenols, alcohols and amines such as triglycidyl-p-aminophenol and N,N,N,N-tetraglycidyl-4,4-methylenebis benzylamine.

In some embodiments, suitable polyimides are selected from aliphatic, semi-aromatic and aromatic polymers formed by the reaction of a dianhydride, such as pyromellitic dianhydride or naphthalene tetracarboxylic dianhydride, and a diamine, such as 4,4_-methylenedianiline, 4,4'-oxydianiline, 1,4-diaminocyclohexane and 4,4'-diaminodicyclohexylmethane, 5,4'-Diamino-2-phenylbenzimidazole, and sulfone diamines.

In some embodiments, suitable vulcanized rubbers are selected from polybutadiene, polyisoprene, polyneoprene, polyisobutylene and copolymers containing butadiene, isoprene, neoprene or isobutylene.

In some embodiments polyurethanes may be selected from polymers manufactured by reaction of an isocyanate, such as toluene diisocyanate, methylene diphenyl diisocyanante and hexamethylene diisocyanate, with a polyether or polyester polyol, where the two reactants contain on average two or more functional groups. The polyether diol may be selected from poly(tetramethylene ether)glycol, polyethylene diol, poly(propylene diol), poly(1,4-butanediol), poly(1,6-hexanediol) and poly(cyclohexane dimethanol), or the polyester diol may be selected from polyadipates, polysuccinates, polysebacates, poly(epsilon-caprolactone) and poly (lactic acid).

In some embodiments, suitable polysiloxanes are selected from crosslinked poly(dimethylsiloxane), polydiphenylsiloxane and copolymers with other saturated or unsaturated monomers, such as epoxy siloxanes.

In some embodiments phenol-formaldehyde resins may be selected from the polymers that result from the reaction of a phenol or substituted phenol with formaldehyde, novalacs, resoles, and phenol-formaldehyde resins that are further reacted with a hardener, such as hexamethylenetetramine.

In some embodiments urea-formaldehyde resins may be selected from the polymers that result from or are based on the reaction of an urea and formaldehyde.

In some embodiments melamine resins may be selected from the polymers that result from or are based on the reaction of an melamine and formaldehyde.

In some embodiments cyanate esters may be selected from the bisphenol or novolac compounds in which the hydrogen of the phenolic OH group is substituted by a cyanide group. Cyanate ester resins may be selected from the polymers formed by the reaction of a cyanate ester with or without other compounds, such as bismaleimides, in the presence of a suitable catalyst, such as transition metal complexes of cobalt, copper, manganese and zinc.

In some embodiments polycyanurate may be selected from polymers that result from the reaction of an isocyanate, such as methylene diphenyl diisocyanate or tri-isocyanate and a polyester polyol.

In some embodiments fiber reinforced thermosets may be selected from compounds of thermoset polymers with reinforcing or non-reinforcing fibers or nanofibers, such as glass, graphite, carbon, polyaramide, polyester, cellulosic, other organic polymers, inorganic compounds, other inorganic polymers or metal and natural fibers such as seed fibers (cotton and kapok), leaf fibers (sisal, banana, fique), bast fibers (flax, jute kenaf, hemp, ramie, rattan), fruit fibers (coconut) and stalk fibers (bamboo, grass, tree wood)

In some embodiments particle-filled thermosets may be selected from compounds of thermoset polymers with reinforcing or non-reinforcing non-fibrous fillers, particles, nanoparticles or additives, such as extenders (e.g., calcium carbonate, wood flour, saw dust, silica, clay), flame retardants (e.g., chlorine compounds, bromine compounds, phosphorus compounds, metallic salts), plasticizers, dispersing agents such as surfactants, colorants, blowing agents and reinforcing particles and nanoparticles (e.g., calcium carbonate, silica, carbon black, glass, metal particles such as aluminum, graphite, silanes, titanates).

The ionized units bonded to the polymer (fixed ion) can be anionic or cationic. In some embodiments, the ionized units are present in the high temperature ionomer at amounts of less than 25 mole %, in other embodiments, less than 15 mole % and, in other embodiments, less than 10 mole % of the total repeat units in the high temperature ionomer. The high temperature ionomer can be either non-crosslinked or covalently crosslinked. The former has the advantage that it can be thermally formed into shape by heat and stress as in a typical polymer processing operation.

The number of bonded anionic or cationic groups in the high temperature ionomer can vary, depending on the desired properties. For example, the ionomer can have about 0.1 to about 1000 milliequivalents of anionic or cationic groups per 100 grams of high temperature ionomer, more specifically about 1 to about 100 milliequivalents of anionic or cationic groups per 100 g of high temperature ionomer.

In some embodiments, the ionized units are anionic units. In some embodiments, suitable anionic units are derived from one or more of carboxylic acids, phosphonic acids, sulfonic acids, amines that form anions, thioglycolic acids.

Neutralization may further improve the physical properties of the high temperature ionomers. Thus, in some embodiments at least some of the ionic groups are neutralized, and, broadly, from 0 to 100% of the ionic groups may be neutralized. Although the preparation of the high temperature ionomer does not require complete ionic group neutralization, in one embodiment, enough acid or base is added to theoretically neutralize at least about 10% of the ionic groups, more specifically at least about 30%, and most specifically at least about 50% of the anionic groups.

The salt form of the high temperature ionomer can be used to produce the shape memory polymer compositions. The salt forms can be obtained by known methods, for example the reaction of the acid form of the ionomer with a neutralizing agent such as a monovalent or divalent metal salt of a weak carboxylic acid. Suitable neutralizing reagents include metallic salts of $C_{1-20}$ alkoxides, $C_{1-20}$ alkanoates, and combinations thereof, wherein the metallic ion of the metallic salt is from Groups IA, IIA, IB, IIB, IIIA, IVA, and VIII of the Periodic Table of Elements. See page B-3, Handbook of Chemistry and Physics, Chemical Rubber Publishing Co., 47th Ed. Suitable monovalent metal ions include $Na^+$, $K^+$, $Li^+$, $Cs^+$, $Ag^+$, $Hg^+$, and $Cu^+$. Suitable divalent metal ions include $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Fe^{+2}$, $Pb^{+2}$, $Co^{+2}$, $Ni^{+2}$, and $Zn^{+2}$. Other neutralizing agents are metallic oxides or hydroxides wherein the metallic ion is from Groups IA, IIA, IIB, IVA, and IVB of the Periodic Table of Elements. Illustrative examples are lead oxide, zinc oxide, calcium oxide, magnesium oxide, sodium hydroxide, magnesium hydroxide, calcium hydroxide, and sodium ethoxide. Still other useful neutralizing agents are ammonia and primary, secondary, and tertiary amines having up to 30 carbons.

In some embodiments, the bonded ionized units are cationic units. In some embodiments, suitable cationic units are derived from one or more of ammonium, quaternary ammonium, phosphonium, pyridinium and ionene.

Neutralization may further improve the physical properties of the high temperature ionomers. Thus, in some embodiments at least some of the ionic groups are neutralized, and, broadly, from 0 to 100% of the ionic groups may be neutralized. Although the preparation of the high temperature ionomer does not require complete ionic group neutralization, in one embodiment, enough acid or base is added to theoretically neutralize at least about 10% of the ionic groups, more specifically at least about 30%, and most specifically at least about 50% of the anionic groups.

The salt form of the high temperature ionomer can be used to produce the shape memory polymer compositions. The salt forms can be obtained by known methods, for example the reaction of the base form of the ionomer with a neutralizing agent such as a metal halide, metal hydroxide or a suitable metal organoanion. Suitable neutralizing groups include C1-20 alkyl halides, C1-20 alkyl sulfates, C1-20 alkyl phosphonates, C1-20 alkyl carboxylates, aryl halides, aryl sulfates, aryl phosphonates, and alpha-diazomethylhalide, alkyl carbonates and combinations thereof, wherein the halide is chosen from Group VIIa of the Periodic Table of Elements. See page B-3, Handbook of Chemistry and Physics, Chemical Rubber Publishing Co., 47th Ed. and the metal cation of the neutralizing agent may include Na+, K+, Li+, Cs+, Ag+, Hg+, Cu+, Be+2, Mg+2, Ca+2, Sr+2, Ba+2, Cu+2, Cd+2, Hg+2, Sn+2, Fe+2, Pb+2, Co+2, Ni+2, and Zn+2 or from Groups IA, IIA, IIB, IVA, and IVB of the Periodic Table of Elements. Illustrative examples are sodium iodide, sodium lauryl sulfate, sodium dodecylbenzenesulfonate, sodium dodecyl sulfate, diisopropylphosphonamidous chloride, and zinc 4-(diazomethyl)aniline chloride.

In some embodiments, suitable high temperature ionomers are those based on amorphous thermoplastics having no crystallinity and a glass transition temperature of 100° C. or greater. Thus the ionic species and polymers or monomers are chosen such that the end result ionomer has a glass transition temperature of at 100° C. or greater. In other embodiments, the high temperature ionomer has a $T_g$ of 150° C. or greater, in other embodiments, 200° C. or greater and, in other embodiments, 250° C. or greater.

In some embodiments, suitable high temperature ionomers are those based on semi-crystalline thermoplastics having some degree of crystallinity and a melting temperature of 100° C. or greater. Thus the ionic species and polymers or monomers are chosen such that the end result semi-crystalline thermoplastic ionomer has a melting temperature of at 100° C. or greater. In other embodiments, the high temperature ionomer has a $T_g$ of 150° C. or greater, in other embodiments, 200° C. or greater and, in other embodiments, 250° C. or greater.

In some embodiments, suitable high temperature ionomers are those based on thermosets having a glass transition temperature of 100° C. or greater. Thus the ionic species and thermoset polymers or monomers are chosen such that the end result thermoset ionomer has a glass transition temperature of at 100° C. or greater. In other embodiments, the high temperature ionomer has a $T_g$ of 150° C. or greater, in other embodiments, 200° C. or greater and, in other embodiments, 250° C. or greater.

In some embodiments, suitable high temperature ionomers are those based on thermosets having some degree of crystallinity and a melting temperature of 100° C. or greater. Thus the ionic species and polymers or monomers are chosen such that the end result thermoset ionomer has a melting temperature of at 100° C. or greater. In other embodiments, the high temperature ionomer has a $T_g$ of 150° C. or greater, in other embodiments, 200° C. or greater and, in other embodiments, 250° C. or greater.

In some embodiments, the high temperature ionomer has a modulus at room temperature of $1\times10^8$ Pa or higher, in other embodiments, $1\times10^9$ Pa or higher and, in other embodiments, $3\times10^9$ Pa or higher.

A specific exemplary high temperature ionomer useful in the preparation of the shape memory polymer is based on poly(ether ether ketone) (PEEK) which is a semi crystalline thermoplastic polymer with excellent mechanical properties. It is resistant to thermal degradation and has a meting temperature of approximately 340° C. and a $T_g$ of 150° C. Neat PEEK exhibits some shape memory behavior where a crystalline phase provides the "permanent" network and the glass transition temperature provides the reversible, thermally actuated temporary network. However, the strains that can be achieved with PEEK are rather small, and the shape memory behavior is relatively poor due to creep of either the "permanent" crystalline network or the glassy temporary network.

In a specific embodiment, PEEK is sulfonated to provide the ionic units that define the ionomer thereof. PEEK is easily sulfonated by an electrophilic substitution reaction with $SO_3$. Suitable sources of $SO_3$ are concentrated sulfuric acid or oleum. The degree of sulfonation can be controlled by varying the reaction time and temperature. Sulfonated PEEK (SPEEK) ionomers with a high degree of sulfonation have high water absorption and poor mechanical properties, so a relatively low degree of sulfonation is preferable so as not to lead to high water absorption and to lead to strong mechanical properties.

Generally the high temperature ionomer is dissolved in concentrated sulfuric acid at a temperature of 25° C. to 50° C. Sulfonation can also be done as a melt, for example using reactive extrusion. Once the sulfonation is complete, the reaction is quenched, for example by the addition of an aliphatic alcohol.

In one embodiment the high temperature ionomer is a PEEK sulfonated to provide about 1 to about 100 milliequivalents (meq) of sulfonic acid groups per 100 grams of high temperature ionomer (meq $SO_3H/100$ g of ionomer), more specifically about 5 to about 40 meq $SO_3H/100$ g of ionomer, or even more specifically about 20 to about 35 meq $SO_3H/100$ g of ionomer. This value is readily determined by elemental sulfur analysis or by titration of the acid form of the polymer.

In some embodiments the salt form of a PEEK thermoplastic ionomer is used to produce the shape memory polymer compositions. The salt forms can be obtained by known methods, for example the reaction of the acid form of the ionomer with a neutralizing agent such as a monovalent or divalent metal salt of a weak carboxylic acid. Suitable neutralizing reagents include metallic salts of $C_{1-20}$ alkoxides, $C_{1-20}$ alkanoates, and combinations thereof, wherein the metallic ion of the metallic salt is from Groups IA, IIA, IB, IIB, IIIA, IVA, and VIII of the Periodic Table of Elements. See page B-3, Handbook of Chemistry and Physics, Chemical Rubber Publishing Co., 47th Ed. Suitable monovalent metal ions include $Na^+$, $K^+$, $Li^+$, $Cs^+$, $Ag^+$, $Hg^+$, and $Cu^+$. Suitable divalent metal ions include $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Fe^{+2}$, $Pb^{+2}$, $Co^{+2}$, $Ni^{+2}$, and $Zn^{+2}$. Other neutralizing agents are metallic oxides or hydroxides wherein the metallic ion is from Groups IA, IIA, IIB, and IVA of the Periodic Table of Elements. Illustrative examples are lead oxide, zinc oxide, calcium oxide, magnesium oxide, sodium hydroxide, magnesium hydroxide, calcium hydroxide, and sodium ethoxide. Still other useful neutralizing agents are quaternary ammonia, phosphonium and primary, secondary, and tertiary amines. In some embodiments, the primary, secondary and tertiary amines have up to 30 carbons.

The low molecular weight non-polymeric compounds that form crystalline or glassy domains in the ionomer and interact with the ionic units to provide a secondary reversible network. In some embodiments, the low molecular weight non-polymeric compounds are selected from fatty acids and/or fatty acid salts (collectively, "FAS"), amines, or amides, phosphates or similar polar, low molecular weight crystalline compounds. Low molecular weight crystalline compounds comprising 8 to 36 carbons, preferably 8 to 23 carbons, are particularly useful.

The low molecular weight non-polymeric compounds are selected to interact with the ionic groups of the ionomer, forming a secondary network that is reversible at a critical temperature, $T_c$. Herein, $T_c$ is the temperature at which the low molecular weight non-polymeric compounds change phase or bonding with the ionomer disappears or weakens sufficiently to break the bonds upon deformation on the ionomer and low molecular weight non-polymeric compound. This change of phase or bond weakening results in a loss of interaction between the ionic groups and the low molecular weight non-polymeric compounds and compromises the secondary network. Thus, an ionomer of this invention having a first shape can be heated above $T_c$ to compromise the secondary network, permitting it to be manipulated by an applied force to a second shape and then cooled down below $T_c$ while maintaining that second shape to reestablish the secondary network in the second shape such that the ionomer will retain the second shape. Upon heating above $T_c$, the secondary network will be compromised and the ionomer will revert back to the first shape.

In some instances where the $T_g$ of the ionomer is suitably lower than the Tm of the low molecular weight non-polymeric compound, the shape memory compound can show triple shape memory. The $T_g$ of the ionomer and the $T_m$ of the low molecular weight compounds each represent a possible transition temperature. The shape memory compound can be heated above both this $T_g$ and $T_m$, permitting it to be manipulated by an applied force to a second shape and then cooled down below $T_m$ and $T_g$ while maintaining that second shape to reestablish the secondary network in the second shape. Then the shape memory compound can be heated to between the two temperatures, permitting it to be manipulated by an applied force to a third shape and then cooled down below $T_g$ while maintaining that third shape to reestablish the secondary network in the third shape and shaped and cooled. Upon heating to between $T_g$ and $T_m$, the shape memory compound will revert to the second shape, and heating to above $T_m$ will cause it to revert to its original first shape. Thus, dual and triple shape memory behaviors are conceivable.

In some embodiments, the low molecular weight non-polymeric compound has a molecular weight of about 50 to about 1000 grams/mole, specifically about 150 to about 500 g/mol. The low molecular weight non-polymeric compound forms crystalline or amorphous, micrometer- and/or nanometer-sized domains in the shape memory polymer composition. Suitable compounds generally have a melting point or glass transition temperature of greater than about 100° C., specifically greater than about 150° C. Such compounds preferably have a melting point or glass transition of less than about 300° C., specifically less than about 250° C.

The low molecular weight non-polymeric compounds are also selected so as to be compatible with the ionomer. In an advantageous feature of the present composition, the ionic groups of the ionomer stabilize the crystalline dispersions of the low molecular weight non-polymeric compound. Here, appropriate selection of the ionomer and the low molecular weight compound provides compositions that are clear and do not bloom over time, even at high concentrations of low molecular weight compound.

With the understanding that the low molecular weight non-polymeric compounds are not likely to be added as or form perfect spheres, in some embodiments, these compounds are less than 10 microns in any given dimension. In other embodiments, these compounds are less than 5 microns in any given dimension, in other embodiments, less that 1 micron, in other embodiments, less than 700 nanometers and, in other embodiments, less than 500 nanometers. In some embodiments, these compounds are greater than 10 nanometers in any given dimension, in other embodiments, greater than 50 nm and, in other embodiments, greater than 100 nm. In some embodiments the low molecular weight non-polymeric compounds are from 10 nanometers to 10 microns in any given dimension, in other embodiments, from 100 nm to 1 micron and, in other embodiments from 100 nm to 500 nm.

The low molecular weight non-polymeric compound can be an amine, an amide, a fatty acid, and/or fatty acid salt. Suitable amines can be straight chain, cyclic, branched chain, or a mixture thereof, and saturated, monounsaturated, polyunsaturated, or aromatic, and can have from 8 to 36 carbon atoms, preferably 8 to 23 carbon atoms. Monoamines, diamines, triamines, or higher amines can be used. Suitable amides can be straight, cyclic, branched chain, or mixture thereof, and saturated, monounsaturated, polyunsaturated, or aromatic, and can have from 8 to 36 carbon atoms, preferably 8 to 23 carbon atoms. Monoamides, diamides, triamides, or higher amides can be used.

The fatty acid can be straight or branched chain, and saturated, monounsaturated, or polyunsaturated aliphatic carboxylic acids having from 8 to 36 carbon atoms, specifically 8 to 30 carbon atoms. Fatty acids containing, 1, 2, 3, or more than three carboxylic acid or carboxylate groups can be used. In one embodiment, the fatty acid is a straight chain, unsaturated or monounsaturated carboxylic acid having from 8 to 21 carbon atoms, in particular lauric, myristic, palmitic, stearic, or oleic acid. The acids or the corresponding cation salts of the acids can be used. Suitable cations include elements of Groups IA, IIA, IB, or IIB of the Periodic Table of Elements. Of these, zinc, magnesium, and calcium can be specifically mentioned, for example zinc stearate. A combination of cations can be used. Fatty acids and fatty acids salts are known additives in polymer compositions, as described, for example, in European Patent Application No. 1,457,305 A1 of Murakami et al., and in U.S. Pat. No. 4,193,899 to Brenner et al. However, such additives are used as plasticizers or processing aids, and the amounts added are insufficient to provide the polymers with good shape memory properties. Furthermore, as described above, a feature of the present composition is that the low molecular weight non-polymeric compound exists as crystalline, micrometer- and/or nanometer-sized domains within the high temperature ionomer matrix.

In some embodiments, the low molecular weight non-polymeric compound is selected from a eutectic mixture of transition metal compounds with Li-salts, such as $Li(Ni_{1/3}Co_{1/3}Mn_{1/3})O_2$, which has a melting point of 260° C.

In some embodiments, the low molecular weight non-polymeric compound is selected from fusible metals, such as alloys of Bi, Pb and Sn, which have melting points of about 270-360° C.

In some embodiments, the low molecular weight non-polymeric compound is selected from ionic liquids, such as the hexafluorosilicate salt of 1-propyl-3-methyl imidazolium, which has a melting point of 210° C.

In some embodiments, the low molecular weight non-polymeric compound is selected from high melting point organic compounds, such as 1,4-benzodioxane-2-carboxylic acid with para-substituted 1-phenylethylamines, which has melting points of about 180-215° C. Thus with respect to the modifier "high melting point" it is meant above 180° C. In other embodiments, the high melting point organic compounds are chosen to have melting points of 200° C. or above.

In some embodiments, the low molecular weight non-polymeric compound can be nanoparticles, such as tin-alloys which have melting points of about 220-240° C.

In some embodiments, the low molecular weight non-polymeric compound can be a melt processable crystalline or amorphous phosphate glass, such as those described in "Crystallization Kinetics of Low-Density Polyethylene and Polypropylene Melt-Blended with a Low-$T_g$ Tin-Based Phosphate Glass" by P. C. Guschi and J. U. Otaigbe, J. Appl. Polym. Sci., 90, 3445-3456 (2003) and the references contained within.

The relative amount of ionomer and low molecular weight non-polymeric crystalline compound will vary depending on the type of ionomer and low molecular weight non-polymeric crystalline compound, and the desired properties of the shape memory polymer composition. The amounts of ionomer and low molecular weight non-polymeric crystalline compound are selected to provide a primary and secondary network structure effective to confer shape memory properties to the composition.

In one embodiment, the shape memory polymer composition comprises about 25 to 90 weight percent of the high temperature ionomer and 10 to 75 weight percent of the low molecular weight non-polymeric crystalline compound, specifically 60 to 90 weight percent of the ionomer and 10 to 40 weight percent of the low molecular weight non-polymeric crystalline compound, and even more specifically 70 to 80 weight percent of the ionomer, and 20 to 30 weight percent of the low molecular weight non-polymeric crystalline compound.

Other additives known for use in shape memory polymer compositions can also be present in amounts normally used, for example, particulate fillers, colorants, UV absorbers, IR absorbers, gamma ray absorbers, antioxidants, flame retardants, thermal stabilizers, mold release agents, lubricants, plasticizers, and the like.

The shape memory polymer compositions are prepared by combining the high temperature ionomer with the low molecular weight non-polymeric crystalline compound. The mixing can be by a variety of means, for example melt blending. The ability to use melt processes is advantageous from a commercial standpoint, as solvents are not required. The shape memory compositions can then be molded into the desired permanent shape. Solution mixing, for example, at room temperature can also be used. Suitable solvents are effective to dissolve each of the components, do not significantly react with the components, and can readily be removed from the mixture, for example by evaporation.

The order of addition of the components does not appear to be critical. In one embodiment, the shape memory polymer composition is covalently crosslinked after formation by known processes. For example, crosslinked sulfonated PEEK may be prepared by heating sulfonated PEEK to above 150° C. in the presence of dimethyl sulfoxide (DMSO)—according to the procedure described in Maranesi, B., et al., Cross-Linking of Sulfonated Poly(ether ether ketone) by Thermal Treatment: how Does the Reaction Occur?, Fuel Cells 13, 2013, No. 2, 107-117. Crosslinked compositions can be less susceptible to creep and hysteresis in the transitioning between permanent and temporary shapes.

The shape memory polymer compositions described herein have a number of advantages. The SMP compositions are readily manufactured using known methods and materials, and they are easy to shape and program. The shape memory properties are very good, with the shape memory recovery (after a cycle comprising heating to above $T_c$, deforming by application of a stress, cooling to below $T_c$, removing the stress, and reheating to above $T_c$ to return the sample to its original shape) of greater than 90%, specifically greater than 92%, more specifically greater than 95%, and even more specifically greater than 98%.

Further, changing the composition and/or amount of the low molecular weight non-polymeric additive allows adjustment of the elastic modulus, transition temperatures, and/or mechanical properties of the shape memory polymer compositions, as well as maximizing the shape memory properties, including shape fixation, recovery, and fill factor. In particular, it has been found that the $T_c$ of the shape memory polymers can be adjusted by varying the identity of the low molecular weight non-polymeric crystalline compound. In most shape memory polymers, the $T_c$ of the polymer is either the glass transition temperature ($T_g$) or melt temperature ($T_m$) of the polymer. Accordingly, adjusting the $T_c$ of most shape memory polymers requires design and synthesis of a new polymer. However, it was found that the relative $T_c$ of the shape memory polymer compositions corresponds to the melting temperature, $T_m$, of the fatty acid used to prepare the composition. Furthermore, the melting point of the fatty acid determines the fixing temperature obtainable in the shape memory polymer composition. Thus, only a single high temperature ionomer needs to be synthesized to cover a range of shape memory behavior between 0 and 300° C., specifically 100 to 200° C., more specifically 150 to 250° C.

The shape memory polymer compositions described herein are useful in applications as diverse as shrink wrapping and shrink tubing, thermally activated snap fittings, self-healing plastics, impression material (for example, for molding and rapid prototyping), films, coatings, adhesives, and other products, toys, actuators, sensors, switches, heat-controlled fasteners, and self-deployable structures. In a specific embodiment, the shape memory polymer compositions are used as or in medical devices.

One embodiment is a method of programming a shape memory article, comprising: heating an article having a first shape and comprising a shape memory composition to a temperature above a shape memory critical temperature of the shape memory composition; wherein the shape memory composition comprises an high temperature ionomer, and a low molecular weight additive that forms crystalline or glassy domains in the high temperature ionomer, wherein the amount of additive is effective to provide crystalline or glassy domains of a size and distribution effective to provide shape memory to the composition; deforming the heated article to form a second shape; and cooling the article, while maintaining the second shape, to a temperature below the shape memory critical temperature.

Another embodiment is a method of programming and deploying a shape memory article, comprising: heating an article having a first shape and comprising a shape memory composition to a temperature above a shape memory critical temperature of the shape memory composition; wherein the shape memory composition comprises a high temperature ionomer as described herein, and a low molecular weight additive that forms crystalline or glassy domains in the high temperature ionomer, also as described herein, wherein the amount of additive is effective to provide crystalline or glassy domains of a size and distribution effective to provide shape memory to the composition; deforming the heated article to form a second shape; cooling the article, while maintaining the second shape, to a temperature below the shape memory critical temperature to fix the second shape; and heating the article having the fixed second shape to a temperature above the shape memory critical temperature, thereby restoring the first shape of the article.

In light of the foregoing, it should be appreciated that the present invention significantly advances the art by providing a high temperature shape memory polymer that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXPERIMENTAL

Materials

PEEK powder with a $M_w$=96 000 g/mol was purchased from Victrex (Grade 450PF). The PEEK was dried in a vacuum oven at 120° C. for 24 hours prior to use. Sulfonated PEEK (SPEEK) was synthesized by dissolving 10 g of PEEK powder into 250 mL of concentrated sulfuric acid (95-98%) with vigorous stirring at 40° C.

Sulfonation is an electrophilic substitution reaction. A suitable source of $SO_3$ is required for the sulfonation reaction. This may be concentrated and acyl sulfate, sulfuric acid, fuming sulfuric acid (oleum) or methane sulfonic acid or the gas formed from these compounds.

For the sulfonation of PEEK, concentrated sulfuric acid was used, and the reaction was allowed to proceed at 40° C. for 5 hours. For PEEK, the sulfonation reaction using concentrated sulfuric acid only substitutes sulfonic acid groups on the phenyl ring attached to the two ether oxygen atoms. The SPEEK was precipitated by dropwise addition of the solution into rapidly stirred deionized water at 0° C. The product was filtered and washed repeatedly with deionized water until the pH was about 7. The sulfonation level was determined by the titration of the sulfonic acid groups. SPEEK was first ion-exchanged with excess saturated aqueous sodium chloride solution overnight, and then the resultant HCl solution was titrated with a normalized (0.01 N) sodium hydroxide solution using phenolphthalein as an indicator. The degree of sulfonation was 18 mol % (IEC=0.60 mequiv/g).

The sulfonic acid derivative of SPEEK was converted to either Na-SPEEK or Zn-SPEEK by neutralization with a 2-fold excess of sodium acetate or zinc acetate. The 18 mol % sulfonated PEEK was swollen by water but did not dissolve in water. Therefore, the neutralization reaction was conducted under heterogeneous conditions. A slurry of SPEEK in distilled water containing either sodium acetate or zinc acetate was stirred for 24 hours at 100° C. and then washed with water and methanol to remove the excess metal acetate. The Na-SPEEK and Zn-SPEEK ionomers were filtered and dried under vacuum at 120° C. for 24 hours, and then the temperature was increased to 180° C. for 2 hours to remove the remaining solvent.

Film samples of M-SPEEK and shape memory compounds of 70 parts M-SPEEK and 30 parts sodium oleate (NaOl, assay >99%, Aldrich Chemical Co.) were prepared by dissolving the M-SPEEK and NaOl in refluxing N-methyl-2-pyrrolidine (NMP). The solution was cast onto a clean glass plate and dried at 80° C. for 48 hours to remove most of the solvent. The film samples were then dried at 150° C. under vacuum for 24 hours prior to characterization. The sample notation used for the ionomer/fatty acid salt (FAS) compound is M-SPEEK/NaOl(30), where M stands for the cation and 30 denotes the weight percentage of NaOl in the compound. PEEK film (approximately 0.3 mm thick) was prepared for comparison by compression molding PEEK powder at 370° C. under a pressure of 15 MPa for 15 min and then cooling slowly to room temperature.

Materials Characterization

The glass transition temperatures ($T_g$) and melting temperatures ($T_m$) were measured with a TA Instruments Q200 differential scanning calorimeter (DSC) using a nitrogen atmosphere and heating and cooling rates of 10° C./min. $T_g$ was defined as the temperature at the half-height of the heat capacity change. $T_m$ was defined at the maximum rate of melting, i.e., the peak temperature of the melting endotherm.

The thermal stability of the materials was measured using a TA Instruments Q50 thermogravimetric analyzer (TGA) from room temperature to 800° C. using a heating rate of 20° C./min.

The tensile stress-strain behavior was measured with an Instron model 1101 universal testing machine using a 100 N load cell. Film samples were cut into dog-bone specimens with gauge length dimensions of approximately 7.3×3.3×0.3 mm. The tests were conducted at room temperature with a crosshead speed of 2 mm/min. The engineering properties that were measured were: tensile stress $\tau \equiv F/A_0$ and tensile strain $\epsilon \equiv (l-l_0)/l_0$, where F is the instantaneous tensile force, $A_0$ is the initial cross-sectional area of the specimen; l and $l_0$ are the instantaneous length and the initial length of the specimen, respectively.

The viscoelastic properties of the films were measured with a TA Instruments Q800 dynamic mechanical analyzer (DMA). Strain sweeps were performed to determine the linear viscoelastic region. Dynamic tensile scans from room temperature to 300° C. were run with a strain amplitude of 0.2%, a frequency of 1 Hz, and a heating rate of 3° C./min. Shape memory cycles to assess fixation and recovery ratio were measured using the controlled force mode of the DMA.

The shape fixation and recovery efficiencies were measured from shape memory cycles carried out using a tensile film fixture and the controlled force mode of the DMA. The film sample was first heated from room temperature to 270° C. with a preload force of 0.005 N. After the sample equilibrated at 270° C., a constant force of 0.5 N was applied to stretch the sample. Once the strain equilibrated, the sample was cooled rapidly, under load, to 30° C. to fix the temporary shape. The force was then lowered to 0.005 N, which was sufficient to prevent sagging of the sample when it was reheated above $T_g$. The shape recovery of the sample was achieved by reheating it to 270° C. with a constant force of 0.005 N and holding it isothermally at 270° C. for 20 min to allow the stain to equilibrate.

Results and Discussion

Thermal Properties of M-SPEEK and M-SPEEK/NaOl Compounds

The parent PEEK was a semi-crystalline thermoplastic polymer with a $T_g$ of 148° C. and a $T_m$ of 338° C. The thermal transitions of the starting materials, the M-SPEEK ionomers and the M-SPEEK/NaOl compounds are listed in Table 1. Sulfonation increased $T_g$, lowered $T_m$, and reduced crystallinity. For 18 mol % sulfonation, SPEEK was completely amorphous and the $T_g$ was 181° C. Conversion of the sulfonic acid derivative to a metal salt further increased $T_g$. The $T_g$ increase is a consequence of the restriction of segmental motion by intermolecular hydrogen bonding for the acid derivative and ionic or dipole-dipole interactions for the salts. For the metal salts, microphase separation of ion-rich domains, i.e., ionic clusters, also occurred, which increased $T_g$ further due to the effect of multifunctional supermolecular cross-linking by the ionic nanodomains, as has been generally observed for ionomers.

The properties of ionomers, such as $T_g$, often scale with the Coulomb energy of the ion pair $\sim q^+q^-/a$, where $q^+$ is the charge of the mobile ion, $q^-$ is the charge of the fixed ion, and a is the separation of the charges, which is essentially the ionic radius. For the sulfonate ionomers, $q^-=1$, so that $E_c \sim q^+/a$, written hereafter as q/a. $T_g$ of the two M-SPEEKs did increase with increasing $E_c$ (see Table 1), which is a consequence of stronger interactions of the ionic dipoles as the electrostatic interactions increase. Thus $T_g$ of the M-SPEEK ionomers, which can be used as the switching temperature for a SMP, may be varied over a wide range—in this case from 181° C. to 253° C.—simply by changing the counterion used. Further control of $T_g$ may also be achieved by varying the sulfonation level.

TABLE 1

Thermal Characteristics of Materials

| materials | g/a | $T_g^a$ (° C.) | $T_m$ (° C.) | relative crystallinity (%) |
|---|---|---|---|---|
| NaOl | | | 259 | |
| PEEK | | 148 | 333 | 30[b] |
| H-SPEEK | | 183 | | 0 |
| Na-SPEEK | 0.91 | 229 | | 0 |
| Zn-SPEEK | 2.86 | 253 | | 0 |
| Na-SPEEK/NaOl(30) | | 176 | 256[c] | 36[c] |
| Zn-SPEEK/MaOl(30) | | 203 | 250[c] | 47[c] |

The addition of NaOl to M-SPEEK reduced the $T_g$ of the composite films by about 20%, which suggests some miscibility of the fatty acid salt and the ionomer. The melting temperature of the NaOl crystals in the compounds was also lower in both compounds, which further supported miscibility. The relative crystallinity of NaOl in the compounds was estimated from the ration of $\Delta H/\Delta H_{NaOl}$, where $\Delta H$ was the measured value for NaOl in the compound and $\Delta H_{NaOl}$ was the corresponding experimental value for the neat NaOl. The crystallinity of the NaOl in the two compounds was significantly suppressed from that of the pure NaOl(table 1), which suggests that partial miscibility or strong interactions between the metal carboxylate groups (FAS) and the metal sulfonate groups (ionomer) suppressed crystallization.

PEEK is thermally stable up to ~500° C. (see TGA data in FIG. 1). Degradation occurs in a single step above 520° C., which is due to random chain scission of the ether and ketone bonds. The pyrolysis left about 50% carbonaceous char from the aromatic groups at 700° C. Sulfonation of PEEK is reported to reduce it thermal stability due to desulfonation below 300° C. FIG. 1 shows that desulfonation of the H-SPEEK began at ~270° C., but the metal salt ionomers were thermally stable to >300° C. Neat NaOl was thermally stable to ~400° C., so the stability of the sulfonate group is the limiting factor in these compositions. Thus, the limiting use of temperature for the ionomers and the ionomer/NaOl compounds was ~300° C.

Mechanical and Viscoelastic Properties

Figure 2:
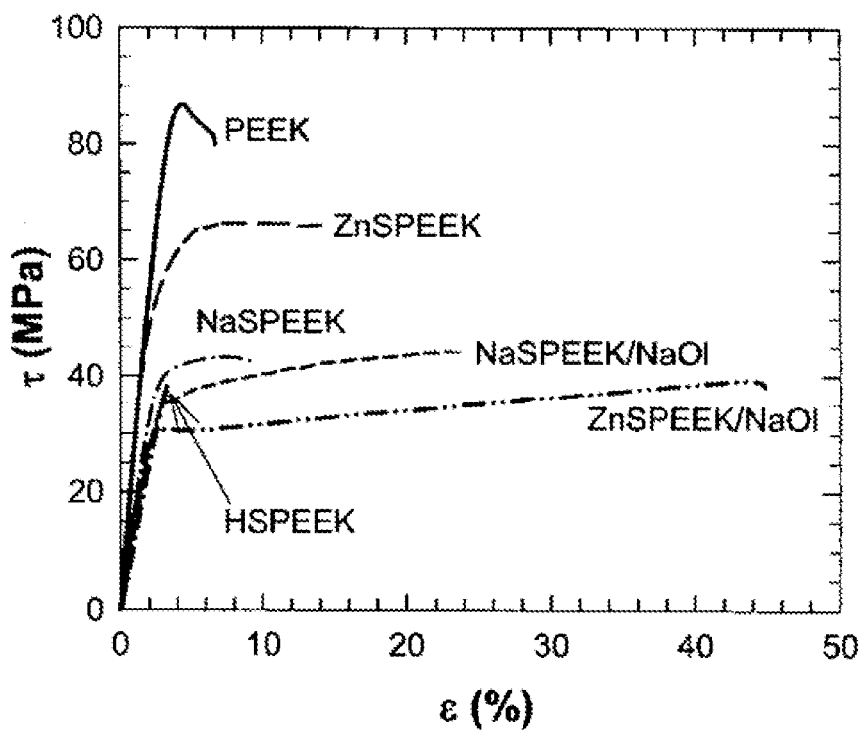
FIG. 2 shows engineering tensile strength versus strain curves at room temperature for neat PEEK, M-SPEEK, and M-SPEEK/NaOl(30)

Example engineering tensile strength versus strain curves for the neat PEEK, ionomers, and the compounds are shown in FIG. 2, and the tensile properties are summarized in Table 2. The Na-SPEEK and Zn-SPEEK films were relatively brittle at room temperature, but the M-SPEEK/NaOl(30) composite films were more ductile. The properties of PEEK film were also measured for comparison. Since PEEK is not soluble in any convenient solvent for casting film, the PEEK film was prepared by compression molding. Surprisingly, the semicrystalline PEEK was the most brittle of the materials used in the study.

TABLE 2

Engineering Tensile Properties[a] of M-SPEEK and M-SPEEK/NaOl(30) Compounds

| sample | E (MPa) | $\sigma_u^b$ (MPa) | $\epsilon_u^c$ (%) |
|---|---|---|---|
| PEEK | 2400 ± 45 | 87 ± 5.6 | 7.3 ± 0.47 |
| H-SPEEK | 1050 ± 72 | 39 ± 0.3 | 3.5 ± 0.1 |
| Na-SPEEK | 1600 ± 56 | 43 ± 8.5 | 9.3 ± 1.2 |
| Zn-SPEEK | 2200 ± 27 | 61 ± 6.6 | 15 ± 2.8 |
| Na-SPEEK/NaOl(30) | 920 ± 87 | 44 ± 11 | 24 ± 7.9 |
| Zn-SPEEK/NaOl(30) | 1300 ± 54 | 40 ± 2.1 | 45 ± 4.7 |

[a]Average and standard deviation of five specimens for each sample.
[b]Stress at yield.
[c]Strain at break.

The sulfonation of PEEK lowered the tensile modulus and the yield stress but increased the ultimate elongation. The lower modulus and yield stress are probably a consequence of the elimination of the crystallinity in the ionomer. The higher elongation is probably die to the physical network formed by association of the ionic species and microphase separation of the ionic species. These behave as physical, reversible crosslinks that provide a mechanism for dissipating strain energy and increase area under the stress—strain curve, i.e., the toughness—defined as strain energy per unit volume absorbed by the material.

Zn-SPEEK was stiffer than Na-SPEEK, which may be a consequence of the divalent cation, which provides a salt bridge between two sulfonate groups, as opposed to a dipole-dipole interaction of sulfonate groups in Na-SPEEK. The addition of NaOl to the ionomers significantly lowered the modulus and ultimate strength, to about 40-55% of the modulus and 45-50% of the yield strength of neat PEEK film, but it also greatly improved the ductility of the film. Those results were consistent with the conclusion that some NaOl was miscible with the ionomers and acts as a plasticizer with regard to the mechanical properties.

Figure 3:
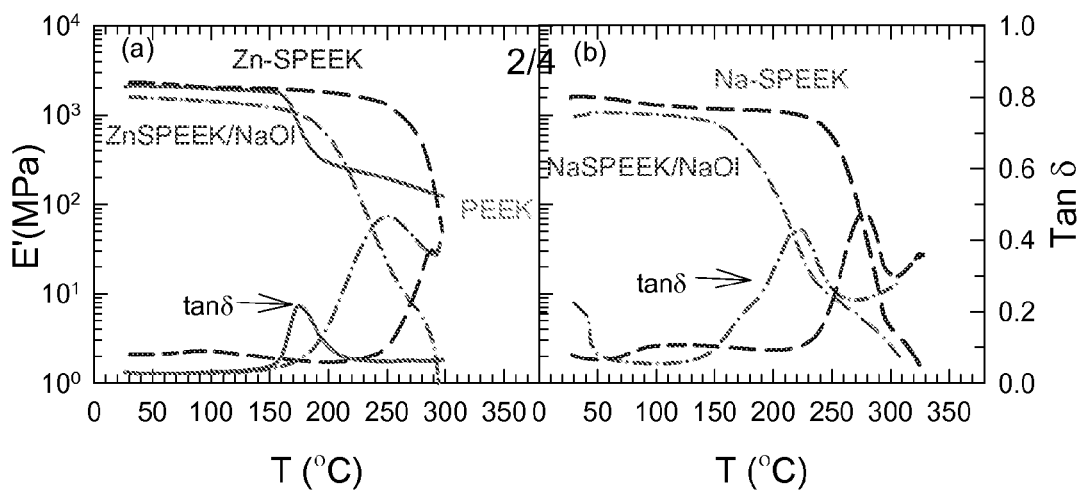
FIG. 3 shows dynamic and loss tensile modulus versus temperature for (a) PEEK, ZnSPEEK, and Zn-SPEEK/NaOl (30); (b) NaSPEEK, and Na-SPEEK/NaOl(30)

The viscoelastic behavior of compounds of the ionomers with NaOl (FIG. 3) suggests that those materials may exhibit not only dual shape memory behavior, but also triple shape memory. The $T_g$ of the compounds was significantly lower than for the neat ionomers, which was likely due to the limited solubility of NaOl in the ionomers. One then expects two specific mechanical transitions for the compounds: $T_g$ of the ionomer and a $T_m$ for the NaOl. These are clearly seen in the tan δ data for the Na-SPEEK composite in FIG. 3, through there is overlap between the two loss dispersions. Both represent a possible $T_c$ and thus, dual and triple shape memory behaviors are conceivable. Two peaks were not resolved in the tan δ data for the Zn-SPEEK composite, but the single loss dispersion seen in FIG. 3 is much broader than the $T_g$ peak in either the neat ionomers for the Na-SPEEK composite. The similarity of the $T_g$ of Zn-SPEEK and $T_m$ of NaOl, 253° C. and 259° C., respectively (See Table 1), suggest that the broad dispersion in FIG. 3 is composed of the two transitions.

An advantage of developing a SMP from PEEK is the thermoplastic nature of the polymer. PEEK can be melt processed at temperatures in excess of 340° C., but the ionomers will degrade at such high temperatures. The ionomers, however, were amorphous, so in principle they should be processable above $T_g$, which for the ionomers and compounds used in this study was less than about 250° C. (See Table 1). Although the linear viscoelastic data indicated that above $T_g$, these materials are still solid-like (E'>E"); the high stresses that are used in conventional polymer processing operations such as extrusion, compression molding, and injection molding might be sufficient to induce plastic flow of the melt. That is the case for other ionomers, e.g., moderately sulfonated polystyrene where the linear viscoelastic behavior is characteristic of solid-like behavior, but the dynamic and loss moduli cross over at some critical strain rate or stress. The latter situation will also probably be improved by processing above $T_m$ of the NaOl, which would then act as a plasticizer for the ionomer melt.

Shape Memory Behavior

Figure 4:
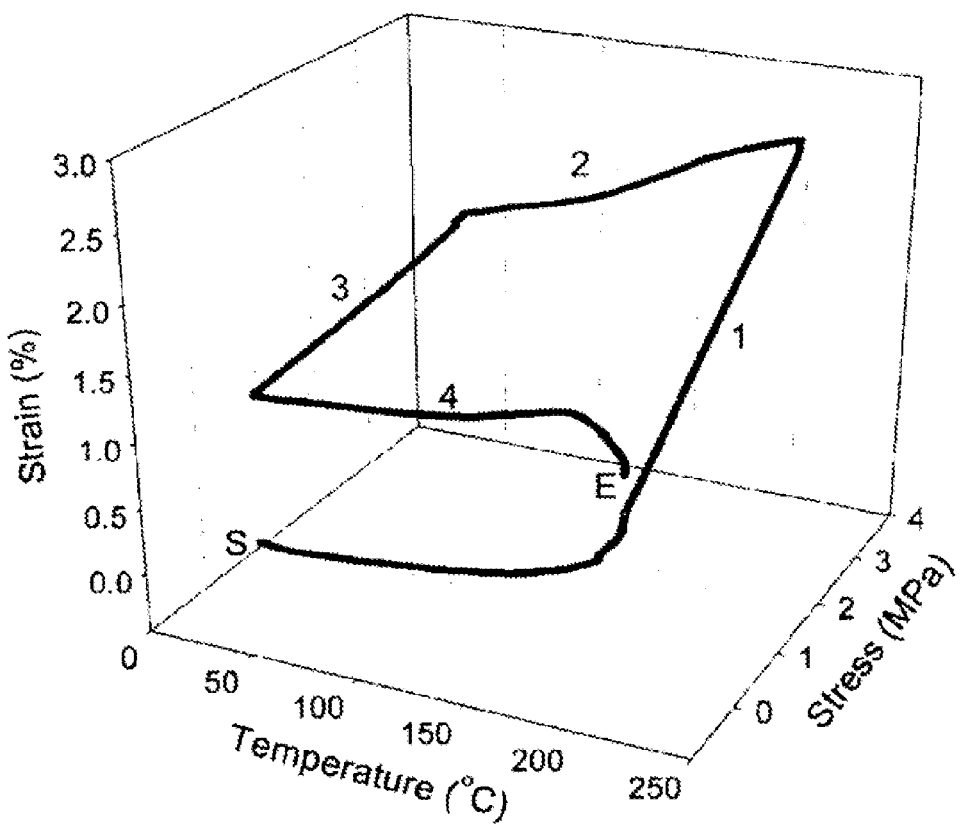
FIG. 4 shows the shape memory cycle for PEEK.

The thermally activated shape memory behavior of neat PEEK is shown in FIG. 4. PEEK crystals provided the permanent network and $T_g$ was $T_c$. The shape fixation and recovery efficiencies were calculated using the following equations:

$$R = \frac{\varepsilon_m - \varepsilon_p(N)}{\varepsilon_m - \varepsilon_p(N-1)} \times 100\%$$

$$F(N) = \frac{\varepsilon_w(N)}{\varepsilon_m} \times 100\%$$

where $\varepsilon_m$, $\varepsilon_p$, $\varepsilon_w$, and N denote the strain after the stretching step (before cooling or unloading the sample), the strain after recovery, the strain in the fixed temporary shape, and the cycle number, respectively. A value of F or R of 100% represents complete strain fixing or recovery.

Although the neat PEEK exhibited some shape memory behavior, only 28% of the deformation was fixed by the temporary network (i.e., the glassy amorphous phase) and the shape recovery efficiency was only recover 35%. The reason for the poor shape memory behavior was the extensive relaxation of the strain during the cooling step following the initial stretching of the sample at high temperature (see path 2 in FIG. 4). During the cooling step, the sample was held at a constant tensile stress, 0.32 MPa, but the stress on the "network" chains increased as the sample was cooled (see the E' data for PEEK in FIG. 3). Apparently, the permanent network formed by the crystalline PEEK phase was insufficient to maintain the sample length as the internal stress increased, which led to the large strain relaxation. The change in strain at $T_g$ in FIG. 3 also clearly demonstrates that point.

In contrast to the neat PEEK, H-SPEEK and the M-SPEEK ionomers were amorphous and the "permanent" network was formed by hydrogen bonding of the sulfonic acid groups or ionic and dipole interactions for the salts. The shape memory behavior of the neat H-SPEEK was not very good (F=54% and R=49%), in that the hydrogen bonding exhibited excessive creep under load. The ionic interactions worked much better than the hydrogen-bonded network or the crystalline network in PEEK.

Figure 5:
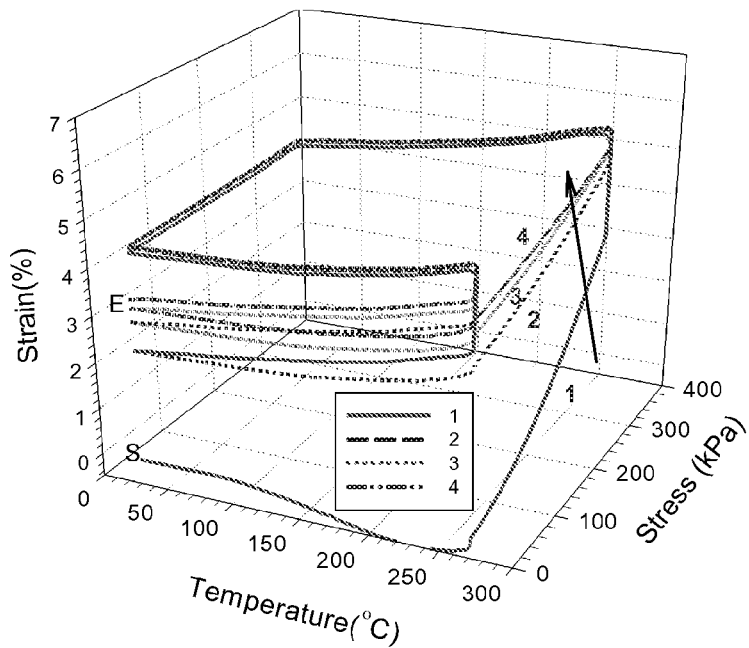
FIG. 5 shows four consecutive shape memory cycles for Na-SPEEK.

FIG. 5 shows four consecutive shape memory cycles for Na-SPEEK, and the shape recovery and fixing efficiencies are summarized in Table 3. The sample film was heated to 270° C., stretched to about 6% strain, and cooled under constant stress to 30° C. After allowing the strain to equilibrate at 30° C., the stress was removed. Shape recovery was achieved by reheating the film to 270° C., which was greater than $T_c=T_g=250°$ C. The shape fixing was significantly improved with Na-SPEEK, but the shape recovery was still poor (see Table 3). The difference in R between the first and subsequent cycles was due to relaxation during the first shape memory cycle of residual stresses from the processing history of the sample, which is commonly observed with other thermoplastic shape memory polymers.

TABLE 3

Shape Fixing and Recovery Efficiencies of M-SPEEKs

| | Na-SPEEK | | Zn-SPEEK | |
|---|---|---|---|---|
| cycle | F (%) | R (%) | F (%) | R (%) |
| 1 | 79 | 32 | 88 | 63 |
| 2 | 78 | 46 | 89 | 92 |
| 3 | 78 | 44 | 89 | 98 |
| 4 | 79 | 44 | 88 | 99 |

Significant improvements for shape fixing and shape recovery were achieved for M-SEEK ionomers by changing the metal cation to zinc (see Table 3). After the first shape memory cycle, the subsequent shape memory cycles were reproducible and the recovery efficiency was nearly perfect. The temporary network, which is stabilized by the glossy stat, did, however, still exhibit some creep relaxation, and the fixing efficiency was only ~90%. The difference between the behaviors of the two M-SPEEK salts is probably due to the fundamental difference in the intermolecular association of the salt groups that comprise the ionic nanodomain cross-links and the larger Coulomb energy of the zinc sulfonate ion pair (~2.5 times that of sodium sulfonate). The $Zn^{2+}$ cation can form a salt bridge whereas the $Na^{2+}$ cation is associated with only one sulfonate group and the cross-link is due to dipole-dipole interactions of the ion pairs.

Figure 6:
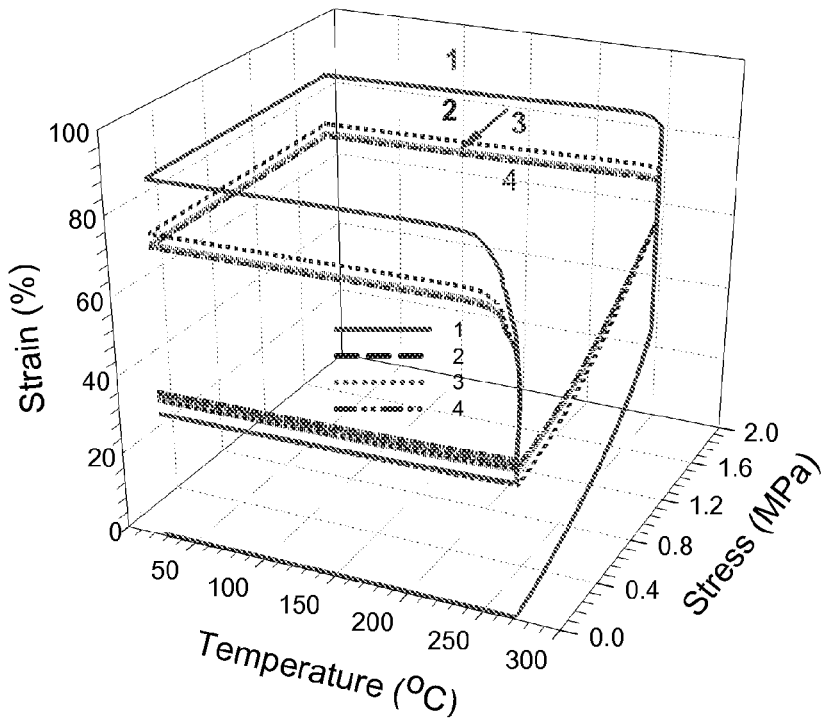
FIG. 6 shows four consecutive shape memory cycles for Zn-SPEEK/NaOl composite film.

The problem of creep recovery of the temporary network for the neat M-SPEEK ionomers was resolved by adding a high melting point fatty acid compound, NaOl. FIG. 6 shows four consecutive shape memory cycles for Zn-SPEEK/NaOl (30), and the fixing and recovery efficiencies for Zn-SPEEK/NaOl(30) and Na-SPEEK/NaOl(30) are summarized in Table 4.

TABLE 4

Shape Memory Properties for M-SPEEK/NaOl(30) Compounds

| | Na-SPEEK/NaOl(30) | | | Zn-SPEEK/NaOl(30) | | |
|---|---|---|---|---|---|---|
| cycle | $T_g$ (° C.) | F (%) | R (%) | $T_g$ (° C.) | F (%) | R (%) |
| 1 | 215 | 97 | 62 | 228 | 97 | 53 |
| 2 | 231 | 97 | 90 | 240 | 96 | 92 |
| 3 | 233 | 97 | 96 | 235 | 96 | 100 |
| 4 | 230 | 97 | 100 | 237 | 96 | 100 |

The composite film was deformed above the $T_m$ of the NaOl in the compound (250° C.) and the $T_g$ of the ionomer in the compound (208° C.). The network formed by the ionic nanodomains served as the "permanent" network, and the temporary network was formed by a combination of the glassy amorphous phase of the ionomer and the crystalline NaOl. The crystallinity of the NaOl in the compound was much less than in the neat as-received NaOl, which for comparison purposes was assumed to be 100% crystalline. For the compound made with Zn-SPEEK, only 47% of the NaOl crystallized and for the Na-SPEEK only 36% crystallized. The reason for the low crystallization of the fatty acid salt is most likely due to partial miscibility of the NaOl with the ionomer, which is also responsible for the 40° C.-50° C. decrease of $T_g$ of the ionomer in the compound (see Table 1).

Except for the initial shape memory cycle, where the recovery efficiency of both compounds was relatively low, ~50-60%, the addition of the NaOl to the ionomers produced shape memory materials with excellent fixing and recovery efficiencies (see Table 4). Both approached 100% for F and R. The improvement of the shape memory behavior by the addition of the fatty acid salt is attributed to the strong interactions between the metal sulfonate groups in the ionomer and the metal carboxylate groups in the NaOl.

Triple Shape Memory Behavior

Figure 7:
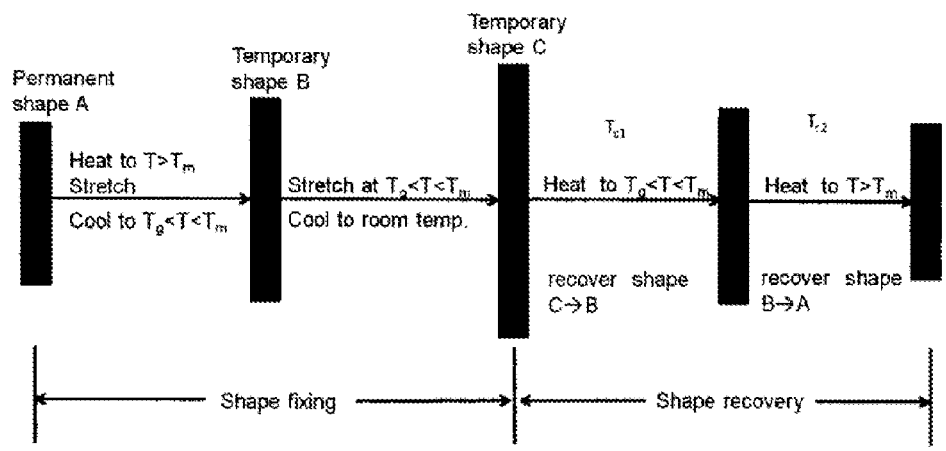
FIG. 7 shows a schematic illustration of a triple shape memory cycle where $T_g$ is from M-SPEEK and $T_m$ is from NaOl.
Figure 8:
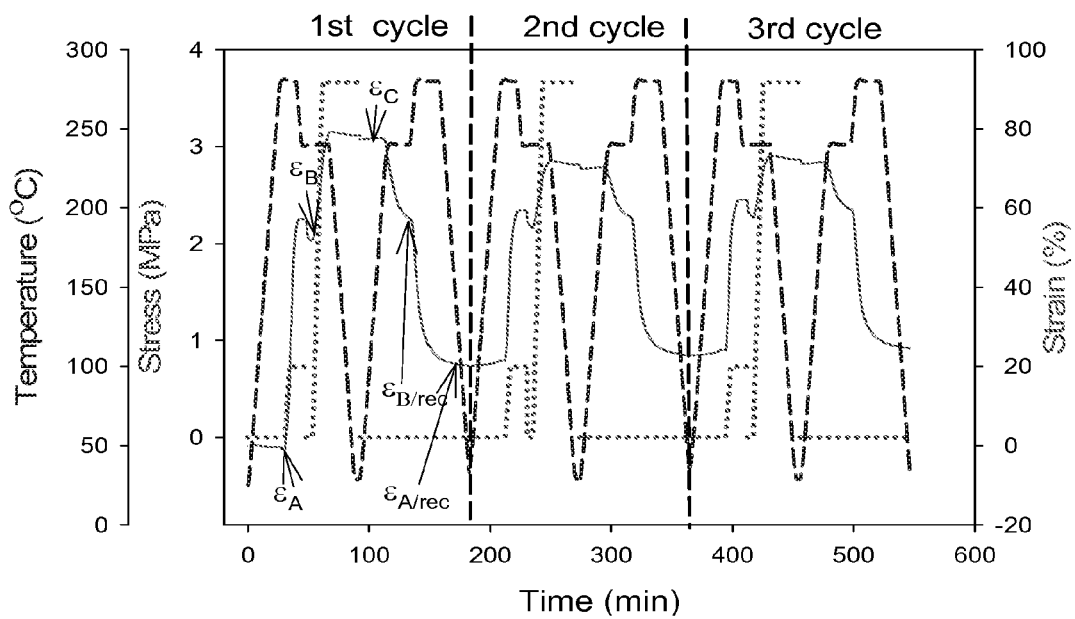
FIG. 8 shows three consecutive triple shape memory cycles for Zn-SPEEK/NaOl(30).

Since there are two reversible physical networks, the NaOl crystals and the ionomer glass, in the compounds, there is the possibility for triple shape memory using the $T_m$ of the NaOl and the $T_g$ of the ionomer matrix to achieve two distinct switching temperatures, $T_{c1}$ and $T_{c2}$. FIG. 7 shows a triple shape memory cycle program where $T_g$ of M-SPEEK is $T_{c1}$ and $T_m$ of NaOl is $T_{c2}$, and FIG. 8 shows three consecutive triple shape memory cycles for Zn-SPEEK/NaOl(30). The $T_g$ of Zn-SPEEK in the compound, 208° C., and the $T_m$ of the NaOl crystals in the compound, 250° C., provides a 42° C. temperature window for a second temporary shape.

The Zn-SPEEK/NaOl(30) film was first heated to 280° C., which is above both transition temperatures, and the film was deformed to 57% strain. The sample was then cooled to 240° C. while keeping the applied stress constant, and the sample was then held at 240° C. to allow the NaOl to crystallize and form a temporary network (temporary shape B in FIG. 7). The external stress was then removed to fix the temporary shape B, which corresponds to Ss in FIG. 8. There was about a 6% strain contraction after the stress was removed.

A second tensile deformation of 79% was then applied to the temporary shape B at 240° C. This was possible since the amorphous ionomer phase was still above its $T_g$ at that temperature. The temperature was then reduced to room temperature while holding the external stress constant. During this cooling step, the amorphous ionomer phase vitrified as the temperature passed its $T_g$, and a second temporary shape (temporary shape C in FIG. 7), corresponding to cc in FIG. 8, was fixed by removing the external stress. $\epsilon_A$ in FIG. 8 denotes the original (permanent) shape of the sample.

Sequential shape recovery was achieved by heating the sample that was in the temporary shape C to 240° C. to recover the temporary shape B and then heating to 280° C. to recover the permanent shape A (see FIG. 7). Shape fixing (F) and recovery (R) can be calculated according to the following equations:

$$R_{x \to y} = \frac{\varepsilon_y - \varepsilon_x}{\varepsilon_{y,load} - \varepsilon_x} \times 100\%$$

$$F_{y \to x} = \frac{\varepsilon_y - \varepsilon_{x,rec}}{\varepsilon_y - \varepsilon_x} \times 100\%$$

where x and y denote two different shapes, $\epsilon_{y,load}$ is the maximum strain after applying load, $\epsilon_y$ and $\epsilon_x$ are fixed strains after unloading, and $\epsilon_{x,rec}$ is the strain after recovery.

The shape memory characteristics for three consecutive triple shape memory cycles for Zn-SPEEK/NaOl(30) and Na-SPEEK/NaOl(30) are summarized in table 5. As with the dual shape memory behavior, the triple shape memory cycles exhibit some permanent strain during the first cycle. For both M-SPEEK/NaOl systems, the shape recovery from temporary shape C to B was not as efficient as that from B to A. For the first recovery step, $T_g$, M-SPEEK$<T<T_{m,NaOl}$, and the recovery of the shape was restricted by temporary cross-links from the NaOl crystals. However, the recovery from temporary shape B to A was near perfect, since the absence of any temporary network at that point allows complete freedom of the permanent network chains to relax.

TABLE 5

Shape Fixing and Recovery Efficiencies Three Consecutive Triple Shape Memory Cycles for M-SPEEK/NaOl(30)

| | Na-SPEEK/NaOl(30)* | | | | | | Zn-SPEEK/NaOl(30) | | | | | |
| --- | --- | --- | --- | --- | --- | --- | --- | --- | --- | --- | --- | --- |
| cycle | $T_{c1}$ (° C.) | $T_{c2}$ (° C.) | $F_1$ (%) | $F_2$ (%) | $R_1$ (%) | $R_2$ (%) | $T_{c1}$ (° C.) | $T_{c2}$ (° C.) | $F_1$ (%) | $F_2$ (%) | $R_1$ (%) | $R_2$ (%) |
| 1 | 204 | 236 | 92 | 93 | 77 | 61 | 215 | 255 | 91 | 95 | 84 | 60 |
| 2 | 209 | 236 | 91 | 83 | 83 | 97 | 217 | 256 | 90 | 90 | 88 | 99 |
| 3 | 213 | 235 | 93 | 73 | 73 | 100 | 214 | 353 | 89 | 88 | 93 | 99 |

*1 denotes temporary shape C₁ and 2 denotes temporary shape B.

$T_{c1}$ represents the switching temperature for the recovery of the temporary shape C to temporary shape B (see FIG. 7), where the glass transition of M-SPEEK serves as the temporary network. $T_{c2}$ is the switching temperature of temporary shape B recovering to permanent shape A, where the NaOl crystals form the temporary network. For Zn-SPEEK/NaOl(30), $T_{c1}$ (~215° C.) was slightly higher than the $T_g$ of Zn-SPEEK (208° C.) and $T_{c2}$ was the melting temperature of the NaOl crystals (~255° C.), which provided a ~45° C. temperature window for programming a second temporary shape. For the Na-SPEEK/NaOl(30) system, the $T_{c1}$ (~208° C.) was much higher than the $T_g$ of Na-SPEEK (170° C.) and $T_{c2}$ (236° C.) was about 20° C. lower than $T_m$ of the NaOl. In that case, the temperature window for a second temporary shape was only 28° C.

What is claimed is:

1. A shape memory composition comprising:
    a high temperature ionomer having a glass transition temperature or a melting temperature of 100° C. or greater and a tensile modulus at room temperature of $1 \times 10^8$ Pa or greater, the high temperature ionomer including a polymer with cationic or anionic units either within the backbone of the polymer or pendant thereto or both; and
    crystalline or glassy domains of a non-polymeric compound dispersed in said high temperature ionomer and interacting with said cationic or anionic units of said high temperature ionomer to form a secondary network characterized by being a reversible network in that it is compromised by the heating of said non-polymeric compound to change out of its crystalline or glassy phase.

2. The shape memory composition of claim 1, wherein said polymer of said high temperature ionomer is thermoplastic or thermoset.

3. The shape memory composition of claim 1, wherein said polymer is thermoplastic and is selected from polyaryletherketones, polyesters, polysulfones, polysulfides, polyamides, polyimides, polyolefins, polyacrylates polycarbonates, polyoxymethylene, ABS, and poly(p-phenylene ether).

4. The shape memory composition of claim 3, wherein the polyaryletherketone is selected from poly(ether ether ketone), (PEEK), poly(ether ketone) (PEK), poly(ether ketone ketone) (PEKK) and polyether ketone ether ketone ketone (PEKEKK).

5. The shape memory composition of claim 1, wherein said polymer is thermoset and is selected from epoxy resins, polyimides, polyesters, polyurethanes, vulcanized rubber, polysiloxanes, phenol-formaldehyde resins, urea-formaldehyde resins, melamine resins, cynate ester resins, polycyanurates, fiber reinforced thermoset polymers, and filled-thermoset resins.

6. The shape memory composition of claim 1, wherein the anionic units are derived from one or more of carboxylic acids, phosphonic acids, sulfonic acids, amines that form anions, and thioglycolic acids.

7. The shape memory composition of claim 1, wherein the cationic units are derived from one or more of ammonium, quaternary ammonium, phosphonium, pyridinium and ionene.

8. The shape memory composition of claim 1, wherein the non-polymeric compound is selected from fatty acids and/or fatty acid salts, amines, amides, phosphates, eutectic mixtures of transition metal compounds, fusible metals, ionic liquids, organic compounds having melting points above 180° C., nanoparticles, and melt processable crystalline or amorphous phosphate glass.

9. The shape memory composition of claim 8, wherein the non-polymeric compound are from 10 nanometers to 10 microns in size in any given dimension.

10. The shape memory composition of claim 9, wherein the non-polymeric compound are from 100 nanometers to 500 nanometers in size in any given dimension.

11. The shape memory composition of claim 8, wherein the non-polymeric compound is from 10 to 75 weight percent of the shape memory polymer composition.

12. The shape memory composition of claim 11, wherein the non-polymeric compound is from 20 to 30 weight percent of the shape memory polymer composition.

13. The shape memory composition of claim 1, wherein the high temperature ionomer is poly(ether ether ketone) (PEEK), and the non-polymeric compound is sodium oleate (NaOl).

14. The shape memory composition of claim 13, wherein PEEK is sulfonated.

* * * * *